US011632718B2

(12) United States Patent
Zhang et al.

(10) Patent No.: US 11,632,718 B2
(45) Date of Patent: Apr. 18, 2023

(54) WIRELESS NETWORKING METHOD HAVING LOW POWER CONSUMPTION AND HIGH INTERFERENCE RESISTANCE

(71) Applicant: QINGDAO JIAOHUWULIAN TECHNOLOGY CO., LTD., Qingdao (CN)

(72) Inventors: Xile Zhang, Qingdao (CN); Yefei Zhang, Qingdao (CN); Lei Zhang, Qingdao (CN)

(73) Assignee: QINGDAO JIAOHUWULIAN TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/941,186

(22) Filed: Sep. 9, 2022

(65) Prior Publication Data

US 2023/0033149 A1 Feb. 2, 2023

Related U.S. Application Data

(63) Continuation of application No. PCT/CN2020/083847, filed on Apr. 9, 2020.

(30) Foreign Application Priority Data

Mar. 13, 2020 (CN) ......................... 202010173922.8

(51) Int. Cl.
*H04W 52/02* (2009.01)
*H04W 72/08* (2009.01)
(Continued)

(52) U.S. Cl.
CPC ....... *H04W 52/0206* (2013.01); *H04L 5/0055* (2013.01); *H04W 72/0446* (2013.01); *H04W 72/535* (2023.01); *H04W 72/541* (2023.01)

(58) Field of Classification Search
CPC ......... H04W 52/0206; H04W 72/0446; H04W 72/082; H04W 72/1257; H04L 5/0055
See application file for complete search history.

(56) References Cited

U.S. PATENT DOCUMENTS

2019/0159282 A1  5/2019  Zhu et al.

FOREIGN PATENT DOCUMENTS

| CN | 106170142 A | 11/2016 |
|---|---|---|
| CN | 108093460 A | 5/2018 |

(Continued)

OTHER PUBLICATIONS

Xiaolan Liu et al., 'Resource Allocation in Wireless Powered IoT Networks', IEEE Internet of Things Journal, vol. 6, No. 3, Jun. 2019, pp. 4935-4945. (Year: 2019).*

(Continued)

*Primary Examiner* — Melvin C Marcelo

(57) ABSTRACT

Disclosed is a wireless networking method having low power consumption and high interference resistance. Basic communication units comprise a base station and a node. The base station takes charge of network construction and management, and the node and the base station communicate with each other by using adaptive frequency hopping and time division multiple access technologies; a plurality of time slots are obtained by division for communication, the time slots are divided into transaction time slots and data time slots, and the transaction time slots take charge of broadcast information transmission, synchronous information transmission, and network access of the node; and the data time slots take charge of data interaction between the base station and the node. The method can achieve available low-power-consumption, large-capacity, high-reliability, and low-latency underlying wireless communication in a complex and congested wireless environment, and can oper- (Continued)

ate in a 2.4 GHz frequency band to achieve worldwide availability.

6 Claims, 1 Drawing Sheet

(51) Int. Cl.
    *H04W 72/12*     (2023.01)
    *H04W 72/04*     (2023.01)
    *H04L 5/00*     (2006.01)
    *H04W 72/541*     (2023.01)
    *H04W 72/50*     (2023.01)
    *H04W 72/0446*     (2023.01)

(56) References Cited

FOREIGN PATENT DOCUMENTS

| CN | 108617005 A | 10/2018 |
| CN | 109788542 A | 5/2019 |

OTHER PUBLICATIONS

Internation Search Report of PCT/CN2020/083847, dated Dec. 14, 2020.

\* cited by examiner

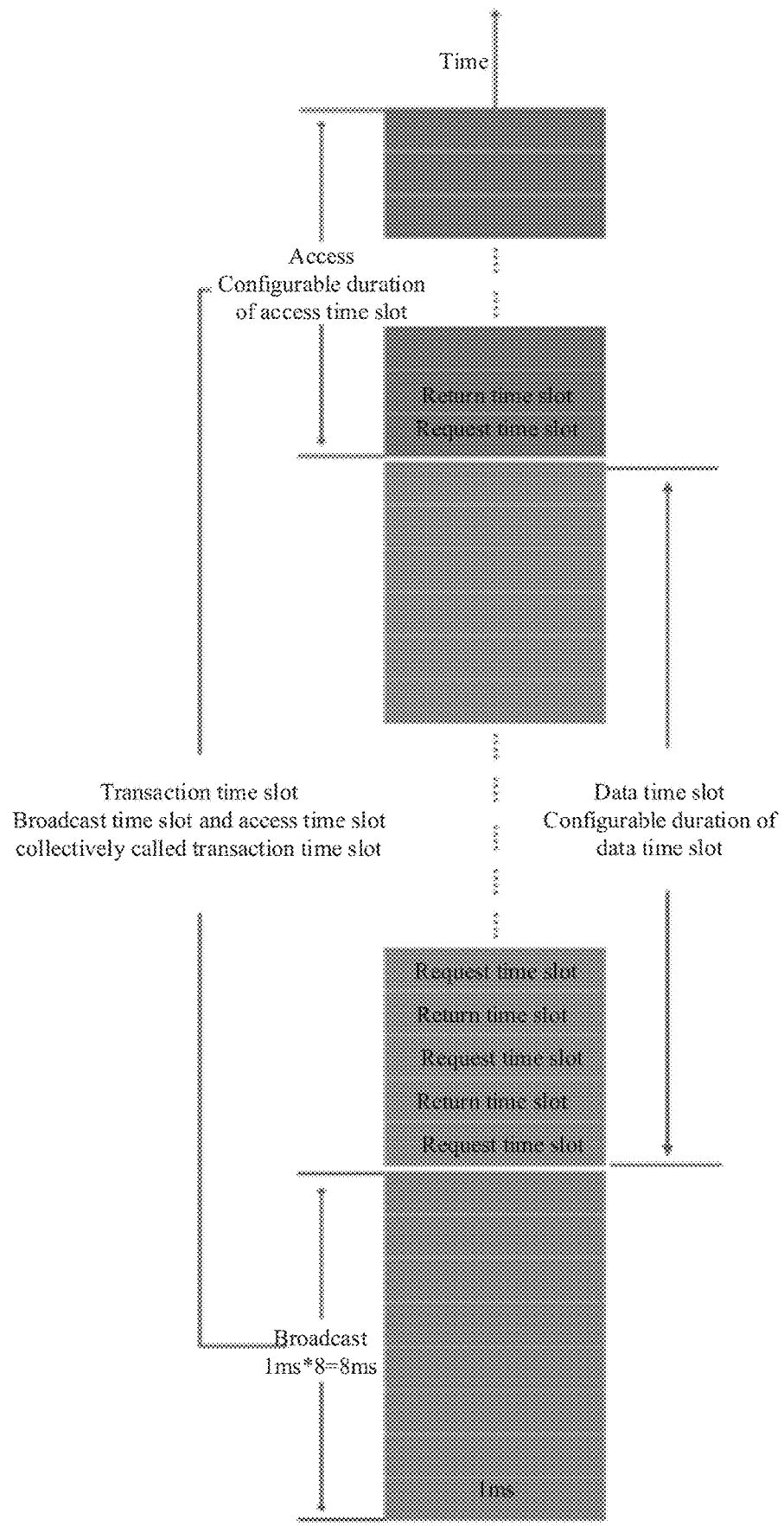

WIRELESS NETWORKING METHOD HAVING LOW POWER CONSUMPTION AND HIGH INTERFERENCE RESISTANCE

CROSS-REFERENCE TO RELATED APPLICATIONS

This application is a continuation of International Patent Application No. PCT/CN2020/083847 with a filing date of Apr. 9, 2020, designating the United States, now pending, and further claims priority to Chinese Patent Application No. 202010173922.8 with a filing date of Mar. 13, 2020. The content of the aforementioned applications, including any intervening amendments thereto, are incorporated herein by reference.

TECHNICAL FIELD

The present invention belongs to the field of communication technologies, and particularly relates to a wireless networking method having low power consumption and high interference resistance.

BACKGROUND

The Internet of Things is the future development trend, and the Internet of Everything is being realized step by step. With the advent of the Internet of Everything, a current wireless communication technology is also facing a huge test of the Internet of Things. At present, commonly used frequency bands of the global Internet of Things are sub 1 G and 2.4 GHz. The regulations on the sub 1 G are different in various countries and regions, so that the sub 1 G is non-universal. The 2.4 GHz may be used worldwide and free of charge. Mainstream wireless communication protocols such as WIFI, Bluetooth and Zigbee are all operated at the 2.4 GHz. Since the WIFI and the Bluetooth have become very popular, the 2.4 GHz has been extremely congested. Especially, the WIFI has an advantage in the 2.4 GHz frequency band due to a high speed and a high bandwidth. An adaptive frequency hopping technology is used in the Bluetooth, so that the Bluetooth may also coexist well with the WIFI. A complex mesh network design of the Zigbee brings a certain amount of radio frequency resource consumption, the frequency hopping technology is not used at the same time, and all radio frequency indexes are less competitive with those of the WIFI at the same time. Therefore, the survival of the Zigbee becomes more difficult.

The Chinese patent document with the publication number CN110493893A and the title "ADAPTIVE DYNAMIC NETWORKING METHOD" discloses a networking method, wherein the network time synchronization is divided into coarse synchronization before network access and fine synchronization after network access, and communication time slots of nodes are allocated by a main node according to preset numbers; and however, the solution above has poor interference resistance, and the reliability of data transmission cannot be guaranteed.

SUMMARY

In order to solve the technical problems above, the present invention provides a wireless networking method having low power consumption and high interference resistance, which aims to achieve available low-power-consumption, large-capacity, high-reliability, and low-latency underlying wireless communication in a complex and congested wireless environment.

The technical solution of the present invention is as follows: a wireless networking method having low power consumption and high interference resistance comprises a base station and a node, and time slots are divided into transaction time slots and data time slots; the transaction time slots comprise broadcast time slots and access time slots, wherein the broadcast time slots take charge of broadcast information transmission and synchronous information transmission, and the access time slots take charge of network access of the node; the data time slots take charge of data interaction between the base station and the node; and networking of the base station and the node comprises the following steps of:

step 1, network access of the node: the base station periodically broadcasts information in the broadcast time slot, and after receiving the broadcast information, the node parses the broadcast information and updates the parsed broadcast information to complete synchronization; the node randomly selects one time slot from the access time slots to request network access according to the acquired broadcast information, and transmits a network access request frame to the base station when an access request sub-time slot in the randomly selected access time slot arrives, and after receiving the network access request frame, the base station returns a network access confirmation frame to the node when an access return sub-time slot of the current node arrives, which contains information of data time slots allocated to the node, and the node enters a connected state; and when the node fails to realize the network access at the current time, a network access request is initiated again when next broadcast time slot arrives until the network access is successful;

step 2, data communication: after the network access of the node is successful, the node interacts data with the base station on the allocated data time slots, wherein the base station allocates a pair of the data time slots to the node, which are divided into a data request sub-time slot and a data return sub-time slot, which means that when the node has data to transmit, the node uploads the data when the data request sub-time slot of the node arrives; after receiving the data of the node, the base station checks whether data to be transmitted to the node exists, when the data to be transmitted to the node exists, returns ACK+ data to the node through the return sub-time slot of the current node, and when the data to be transmitted to the node does not exist, returns ACK+ null data to the node; and when the node does not receive information containing ACK from the base station, the current transmission fails, and the node uploads again when next data time slot arrives; and step 3, off-lining of the node: when detecting that some node has no data to update within specified communication periods, the base station considers that the node corresponding to the data time slot is off-line, and takes back the data time slot and allocates the data time slot to a newly accessed node; and the off-line node is accessed to the network again when the off-line node has a communication demand.

Compared with the prior art, in the solution, each node under the base station has its own independent data time slot, and the node is operated strictly according to its own time slot; when an wireless environment is complex, for example, there is a large amount of WIFI in an area, or many base stations in an area are operated at the same time, reliable communication may be realized; in addition, each node communicates in its own time slot, and sleeps at other times, which leads to very low power consumption, and is especially suitable for a battery-powered device; and during data communication between the base station and the node, the design of double time slots and ACK ensures that the node may receive the data from the base station on one hand, and whether the data transmitted by the node to the base station is successfully transmitted may be known on the other hand.

Based on the solution above, the following improvements are made in the present invention.

Further, each time slot is operated on a different frequency point, and the frequency point of each time slot depends on a frequency hopping sequence initialized by the base station when the network is established. In the technical improvement, the frequency points with severe interference are automatically identified due to a frequency hopping mechanism, thus ensuring a reliability of network communication.

Further, a number, a length and a hopping frequency of the time slots depend on a number of the nodes; the broadcast time slot is a single time slot, the access time slot and the data time slot are double time slots, the broadcast time slot comprises 8 time slots, the access time slot comprises 16 pairs of sub-time slots or n pairs of user-defined sub-time slots, and the data time slot comprises 256 pairs of sub-time slots or m pairs of user-defined sub-time slots; and a whole communication period has 8+2n+2m time slots. In the technical improvement, the time slots are specifically regulated, setting of the double time slots of the access time slot and the data time slot avoids an error in any process, and after knowing an error in this communication, the node may transmit data again in the next communication.

Further, in the step 2, when the node has no data to transmit, the node transmits a null data request frame when the request sub-time slot arrives to show to the base station that the node is on-line. In the technical improvement, the node is avoided from being forced to go off-line.

Further, in the step 1, the broadcast information comprises a beacon synchronization frame and a broadcast frame, the beacon synchronization frame is used for synchronization in each communication between the base station and the node after the network access of the node, and the broadcast frame comprises base station information and frequency hopping information, and is used for updating and synchronizing the information during the network access of the node; and a priority level of the beacon synchronization frame is higher than that of the broadcast frame, and a time slot of the beacon synchronization frame is located before that of the broadcast frame. In the technical improvement, when requesting to the network access for the first time, the node obtains relevant information by parsing the information of the broadcast frame, so as to be synchronized with the base station, and then requests the network access through the access time slots; if the network access request fails, when the next broadcast time slot arrives, the node requests the network access again after obtaining the information of the beacon synchronization frame, that is, after realizing time synchronization with the base station; and in addition, the node may request the network access again synchronously after obtaining the information of the broadcast frame. In each communication period, before the data communication between the node and the base station, it is necessary to obtain information synchronized with the base station through the beacon synchronization frame of the broadcast information, and the broadcast frame is no longer monitored, so that the priority level of the beacon synchronization frame is higher than that of the broadcast frame.

Further, in the step 3, the specified communication periods are 32 communication periods or a number of user-defined periods. In the technical improvement, in order to avoid the node from not communicating for a long time and occupying resources, the node is set to go off-line when the node has no data update in the specified communication periods.

The beneficial effects of the present invention are that the method can achieve available low-power-consumption, large-capacity, high-reliability, and low-latency underlying wireless communication in a complex and congested wireless environment, and can operate in a 2.4 GHz frequency band to achieve worldwide availability.

BRIEF DESCRIPTION OF THE DRAWINGS

FIG. 1 is a time axis diagram of time slots in the present invention.

DETAILED DESCRIPTION

As shown in FIG. 1, a wireless networking method having low power consumption and high interference resistance comprises a base station and a node, and time slots are divided into transaction time slots and data time slots. The transaction time slots comprise broadcast time slots and access time slots, wherein the broadcast time slots take charge of broadcast information transmission and synchronous information transmission, and the access time slots take charge of network access of the node. The data time slots take charge of data interaction between the base station and the node. Networking of the base station and the node comprises the following steps of:

step 1, network access of the node: the base station periodically broadcasts information in the broadcast time slot, and after receiving the broadcast information, the node parses the broadcast information and updates the parsed broadcast information to complete synchronization; the node randomly selects one time slot from the access time slots to request network access according to the acquired broadcast information, and transmits a network access request frame to the base station when an access request sub-time slot in the randomly selected access time slot arrives, and after receiving the network access request frame, the base station returns a network access confirmation frame to the node when an access return sub-time slot of the current node arrives, which contains information of data time slots allocated to the node, and the node enters a connected state; and when the node fails to realize the network access at the current time, a network access request is initiated again when next broadcast time slot arrives until the network access is successful;

step 2, data communication: after the network access of the node is successful, the node interacts data with the base station on the allocated data time slots, wherein the base station allocates a pair of the data time slots to the node, which are divided into a data request sub-time slot and a data return sub-time slot, which means that when the node has data to transmit, the node uploads the data when the data request sub-time slot of the node arrives; when the node has no data to transmit, the node transmits a null data request frame when the request sub-time slot arrives to show to the base station that the node is on-line; after receiving the data of the node, the base station checks whether data to be transmitted to the node exists, when the data to be transmitted to the node exists, returns ACK+ data to the node through the return sub-time slot of the current node, and when the data to be transmitted to the node does not exist, returns ACK+ null data to the node; and when the node does not receive information containing ACK from the base station, the current transmission fails, and the node transmits again when next data time slot arrives; and step 3, off-lining of the node: when detecting that some node has no data to update within specified communication periods, the base station considers that the node corresponding to the data time slot is off-line, and takes back the data time slot and allocates the data time slot to a newly accessed node; the off-line node is accessed to the network again when the off-line node has a communication demand; and the specified communication periods are 32 communication periods or a number of user-defined periods.

Further, in the step 1, the broadcast information comprises a beacon synchronization frame and a broadcast frame, the beacon synchronization frame is used for synchronization in each communication between the base station and the node after the network access of the node, and the broadcast frame comprises base station information and frequency hopping information, and is used for updating and synchronizing the information during the network access of the node. A priority level of the beacon synchronization frame is higher than that of the broadcast frame, and a time slot of the beacon synchronization frame is located before that of the broadcast frame.

Each time slot is operated on a different frequency point, and the frequency point of each time slot depends on a frequency hopping sequence initialized by the base station when the network is established.

As shown in FIG. 1, a number, a length and a hopping frequency of the time slots depend on a number of the nodes or user definition. The broadcast time slot is a single time slot, the access time slot and the data time slot are double time slots, the broadcast time slot comprises 8 time slots, the access time slot comprises 16 pairs of sub-time slots or n pairs of user-defined sub-time slots, and the data time slot comprises 256 pairs of sub-time slots or m pairs of user-defined sub-time slots. A whole communication period has 8+2n+2m time slots. The broadcast time slot comprises 8 time slots. In the embodiment, the synchronization information (which is namely the beacon synchronization frame) is transmitted through a $1^{st}$ time slot in the broadcast time slot. The broadcast information (which is namely the broadcast frame) is transmitted through a $3^{rd}$ time slot in the broadcast time slot. The remaining 6 time slots are reserved, and unused temporarily. Positions of the time slots of the synchronization information and the broadcast information are not limited to the solution above, as long as the priority level of the synchronization information is higher than that of the broadcast information. In addition, in the embodiment, each time slot is 1 ms, with 1,000 hops per second.

An adaptive frequency hopping technology is used in the solution, each time slot is operated on a different frequency point, and the frequency point of each time slot depends on a frequency hopping sequence initialized by the base station when the network is established. For example, in the case that some frequency points are interfered, taking one of the nodes as an example, when the frequency point of the node in this communication is interfered, the node fails to communicate; and when the time slot of the next communication of the node arrives, the frequency point in this communication is different from the last one due to a frequency hopping mechanism, without the interference, and then the node may communicate normally. Meanwhile, the severely interfered frequency points may be automatically identified and then automatically shielded, thus better ensuring reliable communication of the network.

The invention claimed is:

1. A wireless networking method having low power consumption and high interference resistance, wherein a base station and a node are comprised, and time slots are divided into transaction time slots and data time slots; the transaction time slots comprise broadcast time slots and access time slots, wherein the broadcast time slots take charge of broadcast information transmission and synchronous information transmission, and the access time slots take charge of network access of the node; the data time slots take charge of data interaction between the base station and the node; and networking of the base station and the node comprises the following steps of:

step 1, network access of the node: the base station periodically broadcasts information in the broadcast time slot, and after receiving the broadcast information, the node parses the broadcast information and updates the parsed broadcast information to complete synchronization; the node randomly selects one time slot from the access time slots to request network access according to the acquired broadcast information, and transmits a network access request frame to the base station when an access request sub-time slot in the randomly selected access time slot arrives, and after receiving the network access request frame, the base station returns a network access confirmation frame to the node when an access return sub-time slot of the current node arrives, which contains information of data time slots allocated to the node, and the node enters a connected state; and when the node fails to realize the network access at the current time, a network access request is initiated again when next broadcast time slot arrives until the network access is successful;

step 2, data communication: after the network access of the node is successful, the node interacts data with the base station on the allocated data time slots, wherein the base station allocates a pair of the data time slots to the node, which are divided into a data request sub-time slot and a data return sub-time slot, which means that when the node has data to transmit, the node uploads the data when the data request sub-time slot of the node arrives; after receiving the data of the node, the base station checks whether data to be transmitted to the node exists, when the data to be transmitted to the node exists, returns ACK+ data to the node through the return sub-time slot of the current node, and when the data to be transmitted to the node does not exist, returns ACK+ null data to the node; and when the node does not receive information containing ACK from the base station, the current transmission fails, and the node uploads again when next data time slot arrives; and step 3, off-lining of the node: when detecting that some node has no data to update within specified communication periods, the base station considers that the node corresponding to the data time slot is off-line, and takes back the data time slot and allocates the data time slot to a newly accessed node; and the off-line node is accessed to the network again when the off-line node has a communication demand.

2. The wireless networking method according to claim 1, wherein each time slot is operated on a different frequency point, and the frequency point of each time slot depends on a frequency hopping sequence initialized by the base station when the network is established.

3. The wireless networking method according to claim 1, wherein a number, a length and a hopping frequency of the time slots depend on a number of the nodes or user definition; the broadcast time slot comprises 8 time slots, the access time slot comprises 16 pairs of sub-time slots or n pairs of user-defined sub-time slots, and the data time slot comprises 256 pairs of sub-time slots or m pairs of user-defined sub-time slots; and a whole communication period has 8+2n+2m time slots.

4. The wireless networking method according to claim 1, wherein in the step 2, when the node has no data to transmit, the node transmits a null data request frame when the request sub-time slot arrives to show to the base station that the node is on-line.

5. The wireless networking method according to claim 1, wherein in the step 1, the broadcast information comprises a beacon synchronization frame and a broadcast frame, the beacon synchronization frame is used for synchronization in each communication between the base station and the node after the network access of the node, and the broadcast frame comprises base station information and frequency hopping information, and is used for updating and synchronizing the information during the network access of the node; and a priority level of the beacon synchronization frame is higher than that of the broadcast frame, and a time slot of the beacon synchronization frame is located before that of the broadcast frame.

6. The wireless networking method according to claim 1, wherein in the step 3, the specified communication periods are 32 communication periods or a number of user-defined periods.

* * * * *